United States Patent
Durm

(10) Patent No.: US 9,705,568 B2
(45) Date of Patent: Jul. 11, 2017

(54) METHOD AND PLUG-IN CONNECTION FOR INFORMING A PROCESS CONTROL CENTER ABOUT A SENSOR BEING DISCONNECTED FROM A MEASURING TRANSDUCER

(71) Applicant: Endress + Hauser Conducta Gesellschaft für Mess- und Regeltechnik mbH + Co. KG, Gerlingen (DE)

(72) Inventor: Oliver Durm, Benningen am Neckar (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 14/955,325

(22) Filed: Dec. 1, 2015

(65) Prior Publication Data

US 2016/0164576 A1    Jun. 9, 2016

(30) Foreign Application Priority Data

Dec. 8, 2014  (DE) .................... 10 2014 118 066

(51) Int. Cl.
*H01R 11/30*    (2006.01)
*H04B 5/00*    (2006.01)
(Continued)

(52) U.S. Cl.
CPC ........... *H04B 5/0037* (2013.01); *G01D 21/00* (2013.01); *G08B 21/18* (2013.01); *G08C 19/00* (2013.01);
(Continued)

(58) Field of Classification Search
CPC .............. H04B 5/0037; H01R 13/6205; H01R 13/7037; H01R 24/38; H01R 43/26;
(Continued)

(56) References Cited

U.S. PATENT DOCUMENTS 5,882,271 A * 3/1999 Byrd ..................... A63C 19/02
   473/472
6,705,898 B2    3/2004 Pechstein
(Continued)

FOREIGN PATENT DOCUMENTS

DE    4229566 A1    3/1994
DE    10218606 A1    11/2003
(Continued)

OTHER PUBLICATIONS

German Search Report, German Patent Office, Munich, DE, Oct. 14, 2015.

*Primary Examiner* — Xuong Chung Trans
(74) *Attorney, Agent, or Firm* — Mark A. Logan; PatServe

(57) ABSTRACT

A method for informing a process control center about the fact that a sensor is being disconnected from a measuring transducer that is arranged spatially remote from the process control center and electrically connected with the process control center. The sensor is connected with the measuring transducer via a plug-in connection. A method involving automatic transmission of a signal to the process control center when the plug-in connection is opened is designed in such a way that, when opening a bayonet joint that covers the plug-in connection, or when disconnecting the plug-in connection, in order to disconnect the sensor from the measuring transducer, an electric signal is generated in the plug-in connection or the bayonet joint, which is transmitted to the process control center.

10 Claims, 2 Drawing Sheets

(51) Int. Cl.
*H01R 13/62* (2006.01)
*G08B 21/18* (2006.01)
*G08C 19/00* (2006.01)
*H01R 13/625* (2006.01)
*G01D 21/00* (2006.01)
*H01R 13/66* (2006.01)
*H01R 13/703* (2006.01)

(52) U.S. Cl.
CPC ....... *H01R 13/6205* (2013.01); *H01R 13/625* (2013.01); *H04B 5/0031* (2013.01); *H01R 13/6683* (2013.01); *H01R 13/7037* (2013.01)

(58) Field of Classification Search
CPC ............ H01R 2103/00; H01R 13/7032; H01R 13/703; H01R 24/46; H01R 13/641; H01R 13/7031; H01R 29/00; H01R 13/7036; H01R 13/7035
USPC .................................................... 439/39, 188
See application file for complete search history.

(56) References Cited

U.S. PATENT DOCUMENTS

| | | | |
|---|---|---|---|
| 7,733,236 B2 | 6/2010 | Montena | |
| 8,272,271 B2* | 9/2012 | Buschnakowski | G01H 3/00 |
| | | | 73/649 |
| 8,360,801 B2* | 1/2013 | Lynch | H01R 13/641 |
| | | | 439/488 |
| 8,499,107 B2 | 7/2013 | Wittmer | |
| 2010/0136801 A1* | 6/2010 | Limpkin | H01F 38/14 |
| | | | 439/39 |

FOREIGN PATENT DOCUMENTS

| | | |
|---|---|---|
| DE | 102007039528 A1 | 2/2009 |
| DE | 102007062914 A1 | 6/2009 |
| EP | 1206012 A2 | 5/2002 |
| EP | 1401060 A1 | 3/2004 |

\* cited by examiner

METHOD AND PLUG-IN CONNECTION FOR INFORMING A PROCESS CONTROL CENTER ABOUT A SENSOR BEING DISCONNECTED FROM A MEASURING TRANSDUCER

TECHNICAL FIELD

The invention relates to a method for informing a process control center about the fact that a sensor is being disconnected from a measuring transducer that is arranged spatially remote from the process control center and connected with the process control center, whereby the sensor is connected with the measuring transducer via a plug-in connection as well as a plug-in connection for performing the method.

BACKGROUND DISCUSSION

In process control engineering, sensors are positioned in environments in order to measure their physical and/or chemical properties. In the area of the sensor, a measuring transducer is arranged, which transforms the sensor signal and processes it. The sensor and measuring transducer form a measuring chain, which in the following shall mean a transmission route of a primary sensor signal that depends on a parameter to be measured to a unit that is downstream of the sensor, wherein the downstream unit receives the sensor signal or an edited sensor signal in order to process it and to forward it in another form.

The measuring transducers are installed at the installation location and configured according to the measuring task and connected with a process control center. Disconnecting a sensor from a measuring transducer usually results in a fault signal in the process control center, unless a hold signal was initiated prior to intentionally disconnecting the sensor from the measuring transducer. However, manually initiating a hold signal at the measuring transducer is only possible if a direct control interface is provided locally on the measuring transducer. In case of measuring transducers that do not have such a direct control interface, informing the process control center about the intended action is mandatory in order to avoid a fault signal to be issued.

SUMMARY OF THE INVENTION

The present invention has therefore the objective of developing a method and a plug-in connection for informing a process control center about a sensor being disconnected from a measuring transducer, without the necessity of a manual input into the measuring transducer.

According to the invention, the objective is met in such a way that upon opening a bayonet joint that covers the plug-in connection, in order to disconnect the plug-in connection, or upon disconnecting the plug-in connection itself in order to disconnect the sensor from the measuring transducer, an electric signal is generated in the plug-in connection or the bayonet joint, which is transmitted to the process control center. By means of such an automatic electric signal generated in the plug-in connection, the process control center receives the information that an intentional separation between sensor and measuring transducer has been performed, without the necessity of having to inform the process control center in advance. In particular, an actuation of the bayonet joint makes it clear that an intended action by the operating personnel is being performed, so that an inadvertent separation of the plug-in connection can be ruled out. The information of the process control center happens early, even before the sensor is actually disconnected. This method is especially significant for measuring transducers that do not have a local control unit.

Preferably, the electric signal is issued by a changed electric contact inside or outside the plug-in connection when the bayonet joint is opened or the plug-in connection is disconnected. Thus, it is very easy to generate an electric signal that unequivocally informs the process control center of a willfully performed sensor replacement.

Alternatively, the electric signal is issued by a change in a magnetic field when the bayonet joint is opened or the plug-in connection is disconnected. This method is particularly advantageous for measuring transducers that are used in close proximity of aggressive media, as this method can be applied contact-free and hermetically separated, and it enables a wear-free separation of the sensor from an evaluation electronic that is located inside the measuring transducer.

A further variant for detecting an intentional separation of the sensor from the measuring transducer in a galvanically and hermetically separated and wear-free manner can be provided, when the electric signal is generated by a change in an optical radiation caused by the opening of the bayonet joint or the interruption of the plug-in connection.

A further development of the invention relates to a plug-in connection for connecting the sensor to a measuring transducer that is arranged spatially remote to the process control center and connected with the process control center, wherein the sensor is connected to the measuring transducer via a plug-in connection, wherein the plug-in connection has a plug element leading to the sensor and a counter plug that is connected to the measuring transducer. A system that ensures information of the process control center about the separation in a dependable way if the plug-in connection is opened, consists of a plug-in connection, secured with a bayonet joint, wherein at the bayonet joint and/or at the plug-in connection means are positioned that are in effective contact with each other when the bayonet joint is opened or closed or the plug-in connection is released or plugged in, whereby a signal may be activated that notifies the process control center. This method has the advantage that the process control center automatically realizes that an intentional separation of the sensor from the measuring transducer has occurred when the plug-in connection is activated, without manual input of information into the measuring transducer or a prior consultation.

Preferably, the means consist of an electromechanical connection, with a projecting piece being arranged on the plug element or the bayonet joint, which, in the closed condition of the bayonet joint or of the plug-in connection, is attached to a switch contact that is positioned in the counter plug. When the bayonet joint is opened or the plug element is separated from the counter plug, the projecting piece releases the switch contact. By this very simple and hence cost-effective solution, a signal change in the measuring transducer is caused when the projecting piece is released from the switch contact, which makes it clear that a willful separation of the sensor from the measuring transducer has occurred. The turning of the bayonet joint that is configured as a locking mechanism for the plug-in connection, prior to opening suffices to discover that a replacement of a sensor is about to take place.

Alternatively, the means consist of a magnetic connection, with a permanent magnet arranged either on the bayonet joint or on the plug element, which is connected to a magnetically triggered switch contact by means of an effective connection, the switch contact being arranged in or on the counter plug. When the bayonet joint is opened or the plug-in connection released, the permanent magnet changes it's position and thus a magnetic field, which spreads in the counter plug. The change of the magnetic field caused by the movement in the bayonet joint or the plug element is detected by a magnetically triggered switch contact, such as, for example, a reed relay or a Hall effect sensor that is firmly positioned in the counter plug and that sends out an electric signal to the process control center.

In a further alternative design, the means consist of an optical connection, whereby the bayonet joint or the plug element have a reflecting area on their inner surface, and on the counter plug a window is arranged, through which an optical radiation is directed at the reflecting area when the bayonet joint or the plug-in connection are closed. The optical radiation that is reflected by the reflecting area is directed at an electronic unit that is sensitive to radiation and that is arranged in or on the counter plug. In case of a closed bayonet joint or plug-in connection, the reflecting area and the window are arranged one above the other so that an optical radiation is always falling on the electronic unit that is sensitive to radiation. When the bayonet joint or the plug-in connection is released, this contactless connection is interrupted. This is then detected by the electronic unit that is sensitive to radiation, which generates a respective electric output signal that is recognized by the process control center.

In one variant, the bayonet joint is arranged on the counter plug in a turnable manner. Only a short turn has to be performed in order to release the bayonet joint from the counter plug and to reconnect them again. Such an arrangement facilitates the transmission of information about a willful actuation of the plug-in connection to the process control center. Due to this configuration, a hermetically tight connection is ensured, which enables the use of such a plug-in connection in an advantageous manner even in explosive environments.

In a particularly advantageous embodiment, the counter plug is integrated in the measuring transducer, so that the electronic unit needed for the analysis of the signal is well protected and can thus be used even in difficult environments, like, for example, in humid and explosive areas.

In a further development, the plug-in connection comprises an inductive interface for data and/or energy exchange within the counter plug, along with a complementary inductive sensor interface of the plug element. The data exchange from the measuring transducer to the sensor occurs by modulation of the energy signal on the transducer side, and the data transfer from the sensor to the measuring transducer occurs, for example, by load modulation of the energy signal on the sensor side. Using the inductive interfaces reliably prevents spark formation when the plug-in connection is opened.

BRIEF DECRIPTION OF THE DRAWINGS

The invention allow numerous embodiments. Several of them shall be explained below with reference to the figures that are depicted in the drawings.

What is depicted is:

DETAILED DISCUSSION IN CONJUNCTION WITH THE DRAWINGS

Figure 1:
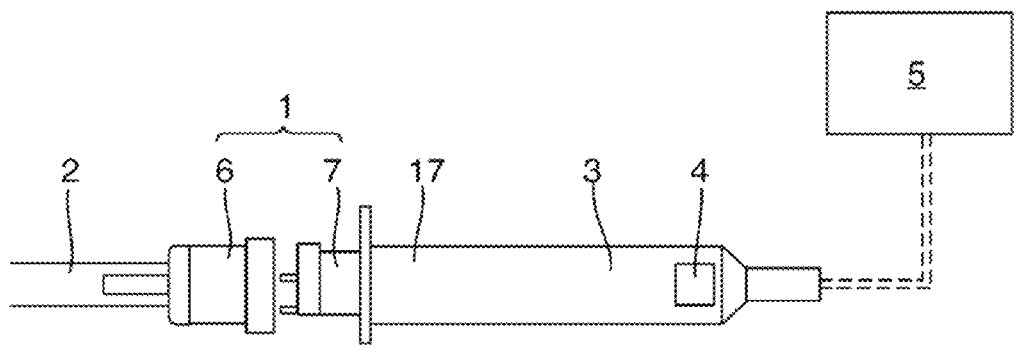
FIG. 1 is a schematic diagram of a measuring chain in a processing system.

In FIG. 1, a schematic diagram of a measuring chain is depicted, as configured in a processing system in process control engineering. A sensor 2 is connected to a measuring transducer 3 via a plug-in connection 1. The sensor 2 as well as the measuring transducer 3 are positioned in a location, where a process parameter has to be measured. This process parameter is detected by the sensor 2 that forwards its output signals to the measuring transducer 3. Here, the sensor signals are processed and converted into a measuring result that can be read directly in a display 4 that is arranged locally, or forwarded by an electric or wireless transmission to a remote process control center 5. The plug-in connection 1 is designed as a plug-in coupling consisting of a plug element 6 and a counter plug 7. The counter plug 7 comprises a complementary plug element that fits into the plug element 6. This plug-in coupling represents a galvanically separated, inductively coupling plug-in connection 1, which is, for example, described in the European Patent, EP 1 206 012 A2.

The plug element 6 engages in the counter plug 7, which is an integral part of the measuring transducer 3 and has a sensor electronics 8. The counter plug 7 is thus configured as a fixed component. As the counter plug 7 is part of the measuring transducer 3, a direct connection to the process control center 5 exists, which is arranged in a location that is remote from the measuring transducer 3 and thus also remote from the location of the measurement.

Figure 2:
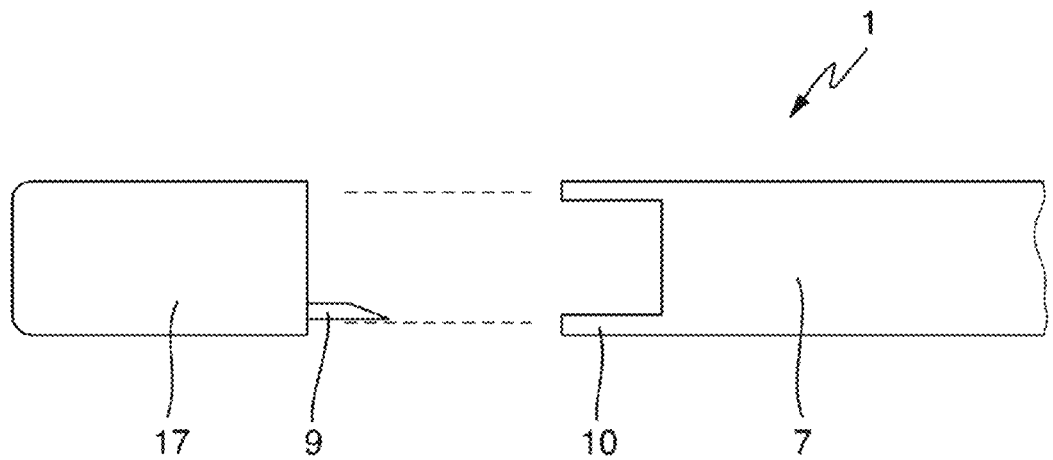
FIG. 2 is a first example of an embodiment of a plug-in connection according to the invention;.

In FIG. 2, the counter plug 7 of the described plug-in connection 1 is shown, which is covered by the turnable bayonet joint 17, which serves as an interlock system for the plug-in connection 1 when the plug element 6 is in contact with the counter plug 7. In the first embodiment example, there is a projecting piece 9 arranged on the inside of the bayonet joint 17, which, in the closed condition of the plug-in connection 1 with the bayonet joint 17 being locked, presses against an electromechanical switch contact 10 that is located inside the counter plug 7, in order to be able to inform the process control center 5 about a willful separation of the sensor 2 from the measuring transducer 3.

Figure 3:
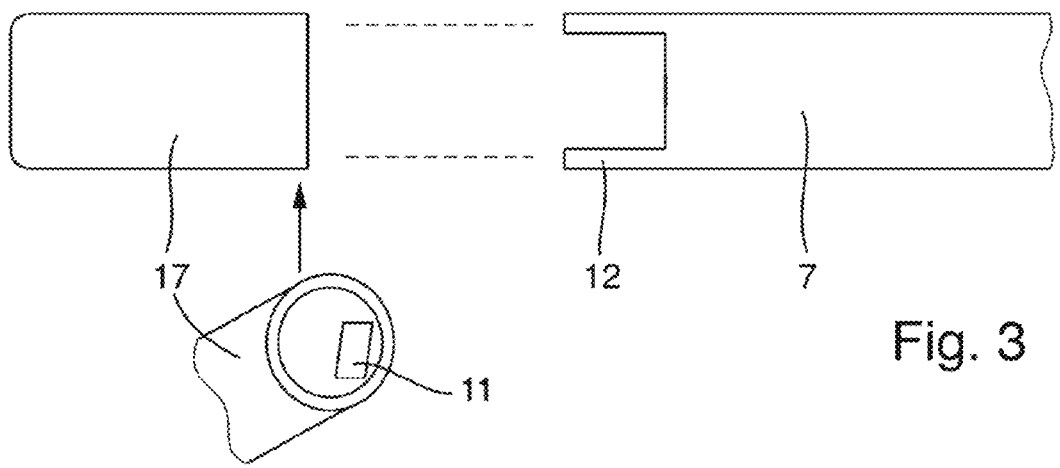
FIG. 3 is a second example of an embodiment of a plug-in connection according to the invention.

In a second embodiment example, a permanent magnet 11 is arranged inside the bayonet joint 17, which, when the plug-in connection 1 is closed and the bayonet joint 17 locked, generates a magnetic field in a certain position with a reed relay 12 that is axially arranged inside the counter plug 7, the magnetic field being detected by the reed relay 12. When the bayonet joint 17 is opened by turning, the permanent magnet 11 with the bayonet joint 17 is moved away from the reed relay 12, which results in a change within the magnetic field currently active within the reed relay 12. This change is detected by the reed relay 12 and converted into an appropriate electric signal, which is then transmitted to the process control center 5 (FIG. 3).

Figure 4:
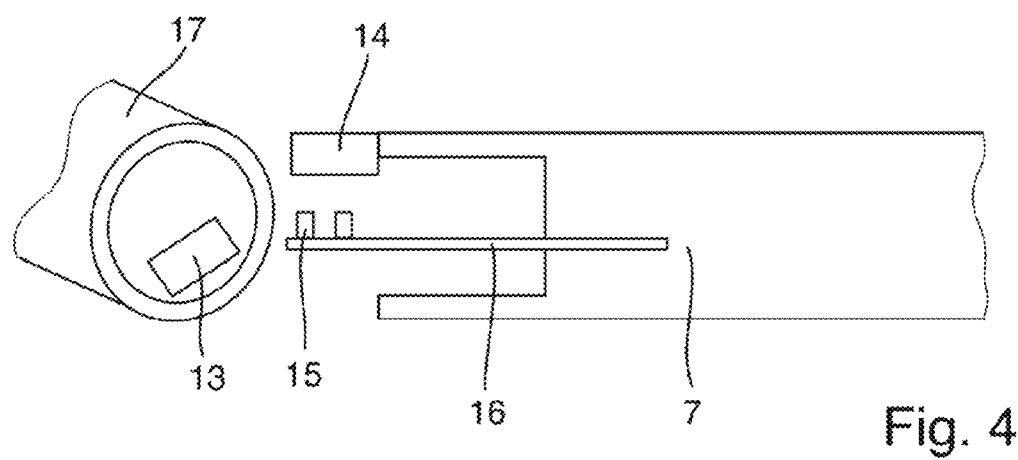
FIG. 4 is a third example of an embodiment of a plug-in connection according to the invention.

In FIG. 4, a further embodiment example is shown, which features a reflecting area 13, like, for example, an aluminum foil, arranged on the inside of the bayonet joint 17. In closed condition of the bayonet joint 17, light falls on the reflecting area through a hermetically sealed window 14 in the counter plug 7. This light is reflected by the reflecting area 13 and directed to a LED 15 that is firmly installed on a circuit board 16 that carries the sensor electronics 8 of the counter plug 7. The LED 15 receives the reflected light and sends out an appropriate electric signal to the process control center.

When the bayonet joint 17 is turned, the position of the bayonet joint is detected by magnetic, optical or electrical means, which results in an automatic transmission of a signal about the sensor 2 being separated from the measuring transducer 3. This solution is particularly significant for measuring transducers 3 that do not have a control unit for manual input of information. From a technological point of view, this involves a separation of the plug-in connection, whereby the whole arrangement remains hermetically closed, in order to enable the use of it even under difficult environmental conditions of the measuring field, like, for example, humidity, dirt and explosive areas.

The invention claimed is:

1. A method for informing a process control center about disconnection of a sensor from a measuring transducer that is arranged spatially remote from the process control center and connected with the process control center, whereby the sensor is connected with the measuring transducer via a plug-in connection, comprising:
    providing
        the plug-in connection whereby the sensor is connected to the measuring transducer via the plug-in connection, the plug-in connection having a plug element connected to the sensor and a counter plug connected to the measuring transducer,
        a bayonet joint that covers the plug-in connection for disconnecting the plug-in connection, or for separating the sensor from the measuring transducer, and
        a switch disposed at said bayonet joint and/or at said plug-in connection, wherein when said bayonet joint is opened or said plug-in connection is released, an information signal is issued from the switch to said process control center;
    opening the bayonet joint thereby changing the state of the switch; and
    issuing the information signal from the switch to the process control center.

2. The method according to claim 1, wherein:
the electric signal is issued by a changed electrical contact inside or outside the plug-in connection when the bayonet joint is opened or the plug-in connection is disconnected.

3. The method according to claim 1, wherein:
the electric signal is issued by a change in a magnetic field caused by the bayonet joint being opened or the plug-in connection being disconnected.

4. The method according to claim 1, wherein:
the electric signal is issued by a change in an optical radiation caused by the bayonet joint being opened or the plug-in connection being disconnected.

5. A plug-in connection for connecting a sensor to a measuring transducer that is arranged spatially remote from a process control center and connected with said process control center, comprising:
    a plug-in connection whereby the sensor is connected to the measuring transducer via said plug-in connection, said plug-in connection has a plug element leading to the sensor and a counter plug that is connected to the measuring transducer;
    a bayonet joint; and
    a switch disposed at said bayonet joint and/or at said plug-in connection, wherein when said bayonet joint is opened or when said plug-in connection is released, an information signal is issued from the switch to said process control center.

6. The plug-in connection according to claim 5, wherein:
said switch is an electromechanical switch, whereby a projecting piece is arranged on said plug element or said bayonet joint, which, in closed condition of said bayonet joint or of said plug-in connection, is attached to a switch contact that is positioned in said counter plug, and, when said bayonet joint is opened or said plug element is separated from said counter plug, said projecting piece releases said switch contact.

7. The plug-in connection according to claim 5, wherein:
said switch is a magnetic switch, whereby a permanent magnet is arranged either on said bayonet joint or on said plug element, which is connected to a magnetically triggered switch contact by means of an effective connection, said switch contact being arranged in or on said counter plug.

8. The plug-in connection according to claim 5, wherein:
said switch is an optical switch, whereby said bayonet joint or said plug element has a reflecting area arranged on an inner side, and said counter plug has a window arranged on it, through which an optical radiation falls on said reflecting area when said bayonet joint or said plug-in connection is closed, whereby the optical radiation that is reflected by said reflecting area is directed towards an electronic unit that is sensitive to radiation and that is arranged inside or on said counter plug.

9. The plug-in connection according to claims 5, wherein:
said bayonet joint is mounted on said counter plug in a turnable way.

10. The plug-in connection according to claim 5, wherein:
said plug-in connection includes an inductive interface inside said counter plug for data and/or energy exchange along with a complementary inductive sensor interface arranged inside said plug element.

* * * * *

UNITED STATES PATENT AND TRADEMARK OFFICE
CERTIFICATE OF CORRECTION

PATENT NO.        : 9,705,568 B2                           Page 1 of 1
APPLICATION NO.   : 14/955325
DATED             : July 11, 2017
INVENTOR(S)       : Oliver Durm It is certified that error appears in the above-identified patent and that said Letters Patent is hereby corrected as shown below:

In the Claims

Claim 1 Column 5, Line 16-17:
Insert --a-- after the word "about" and before the word "disconnected".

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*